(12) United States Patent
Xiong et al.

(10) Patent No.: US 6,771,521 B1
(45) Date of Patent: Aug. 3, 2004

(54) ACTIVE SNUBBER FOR SYNCHRONOUS RECTIFIER

(75) Inventors: Yahong Xiong, Neihu Taipei (TW); Zhongwei Ke, Neihu Taipei (TW); Alpha J. Zhang, Neihu Taipei (TW)

(73) Assignee: Delta Electronics, Inc., Taoyuan (TW)

( * ) Notice: Subject to any disclaimer, the term of this patent is extended or adjusted under 35 U.S.C. 154(b) by 16 days.

(21) Appl. No.: 10/371,449

(22) Filed: Feb. 20, 2003

(51) Int. Cl.[7] .............................................. H02H 7/125
(52) U.S. Cl. .................... 363/53; 363/21.06; 363/21.14
(58) Field of Search ........................... 363/21.06, 21.14, 363/52, 53, 127

(56) References Cited

U.S. PATENT DOCUMENTS 5,877,947 A * 3/1999 Chen et al. .................... 363/53
5,898,581 A * 4/1999 Liu ............................... 363/53
6,069,802 A * 5/2000 Priegnitz .................. 363/21.06

* cited by examiner

Primary Examiner—Jessica Han
(74) Attorney, Agent, or Firm—Haverstock & Owens LLP

(57) ABSTRACT

The invention relates to an active snubber for synchronous rectifier. The active snubber is coupled across a synchronous rectifier having a first synchronous MOSFET and a second synchronous MOSFET coupled to a transformer in a power converter. The active snubber includes a series-coupled active switch and first snubber capacitor which is coupled between a drain terminal and a source terminal of the first synchronous MOSFET, a gate driver operative to keep the active switch conducting a specified period of time during a non-conduction interval of the first synchronous MOSFET. The gate driver is composed of an auxiliary winding, a capacitor, and a resistor, wherein the auxiliary winding and the capacitor are connected in series and then coupled across the resistor in parallel, which is coupled between a gate and a source of the active switch.

29 Claims, 12 Drawing Sheets

ACTIVE SNUBBER FOR SYNCHRONOUS RECTIFIER

FIELD OF THE INVENTION

The present invention relates to power supplies and, more specifically, to an active snubber circuit for synchronous rectifier to reduce the turn-off voltage spike and high frequency ringing associated with synchronous rectifier.

BACKGROUND OF THE INVENTION

Synchronous rectification is widely applied in a low voltage and high current DC/DC converter. As it is known in the art, in the customarily used half-wave synchronous rectifier, synchronous MOSFET is selectively turned on and off in synchronicity with the secondary voltage of an isolate power transformer. In this way the secondary voltage of the transformer is rectified and transferred to the output. However, there exists a high voltage spike and high frequency ringing between the drain and the source of the freewheeling synchronous MOSFET. Such voltage spike is caused by the poor reverse recovery characteristic of the body diode of the freewheeling synchronous MOSFET, and imposes severe stress on the freewheeling synchronous MOSFET. As a result, higher rated MOSFET are needed to prevent the breakdown of the freewheeling synchronous MOSFET. Since higher voltage rated MOSFET has larger conduction resistor leading to higher conduction loss of the freewheeling synchronous MOSFET, several attempts have been made to suppress the high voltage spikes and high frequency ringing associated with additional circuit.

FIG. 1 shows a RC snubber including a capacitor C and a resistor R, which has been utilized widely in the synchronous rectifier to suppress the voltage spike and voltage ringing. As shown in FIG. 1, the RC snubber is coupled across the freewheeling synchronous MOSFET S1. The capacitor C decreases the rising speed of the voltage across the freewheeling synchronous MOSFET S1 and absorbs the voltage spike energy. The resistor R provides necessary damping to reduce the voltage ringing. Since the energy stored in the capacitor C is discharged fully via the resistor R during each switching cycle, the RC snubber brings large energy dissipation. The symbol T represents the isolate power transformer. The symbol N1 and N2 represent the primary winding and the secondary winding of the isolate power transformer T.

FIG. 2 shows a RCD clamping circuit implemented in a half-wave synchronous rectifier. A clamping capacitor C is coupled across a freewheeling synchronous MOSFET S1 through a diode D. Therefore, the voltage spike of the freewheeling synchronous MOSFET S1 can be clamped by the capacitor C. And a resistor R is placed across the clamping capacitor C and the output capacitor Co. By this way, the excessive voltage spike energy stored in the capacitor C is transferred to the output capacitor Co through the resistor R. That is to say, a portion of spike energy is recovered. Accordingly, the RCD snubber circuit brings lower energy dissipation in comparison with the RC snubber circuit in FIG. 1.

Another commonly used method applied in diode rectifier to reduce the voltage spike is active snubber circuit. FIG. 3 illustrates a schematic diagram of a full-bridge diode rectifier employing an active snubber. The active snubber branch consisting of an active switch Sa and a snubber capacitor Ca connected in series is coupled across the output terminal of the rectifier. The gate drive signal for the active switch Sa is derived from the primary side circuit via a logic circuit, an isolate transformer T1 and a driving circuit. The driving circuit keeps the active switch Sa being turned on during a time interval that the secondary winding of the power transformer outputs a high voltage level. The reverse recovery energy of the rectifier diode is transferred to the snubber capacitor through the body diode Da of the active switch Sa. And during the conduction interval of the active switch Sa, the excessive reverse recovery energy stored in the snubber capacitor Ca is transferred to the output filter without any dissipation. Therefore, the active snubber is an effective lossless snubber circuit. However, since the drive signal of the active switch Sa is derived from the primary side via an additional isolated driving circuit, the complexity and the component cost are increased greatly.

A synchronous rectifier has been utilized widely in a low voltage and high current DC/DC converter. However there exists a high voltage spike across the synchronous rectifier due to the poor reverse recovery characteristic of the body diode of the synchronous rectifier. It is seen that the active snubber brings perfect performance when it is applied to the diode rectifier, except that the complicated driving for the active switch. Accordingly, in order to eliminate the voltage spike, the present invention implements an active snubber circuit in the synchronous rectifier circuit, and proposes a driving circuit for the active switch, which has a simple structure and uses fewer components.

It is therefore attempted by the applicant to deal with the above situation encountered with the prior art.

SUMMARY OF THE INVENTION

It is therefore an object of the present invention to propose an active snubber circuit for synchronous rectifier to reduce the turn-off voltage spike and high frequency ringing associated with synchronous rectifier.

It is therefore another object of the present invention to propose an active snubber circuit for synchronous rectifier, in which a driving circuit for the active switch has a simple structure and uses fewer components.

In accordance with the first aspect of the present invention, the active snubber is coupled across a synchronous rectifier having a first synchronous MOSFET and a second synchronous MOSFET coupled to a transformer in a power converter. The active snubber includes a series-coupled active switch and first snubber capacitor which is coupled between a drain terminal and a source terminal of the first synchronous MOSFET, a gate driver operative to keep the active switch conducting a specified period of time during a non-conduction interval of the first synchronous MOSFET. The gate driver is composed of an auxiliary winding, a capacitor, and a resistor, wherein the auxiliary winding and the capacitor are connected in series and then coupled across the resistor in parallel, which is coupled between the gate and the source of the active switch.

Preferably, the gate driver further includes a diode coupled across the capacitor.

Preferably, the active switch is a N-channel MOSFET.

Preferably, the active switch is a P-channel MOSFET.

Preferably, the auxiliary winding is derived from the transformer.

Preferably, the power converter further includes an output filter circuit having at least an output inductor and an output capacitor, and the auxiliary winding is derived from the output inductor.

Preferably, the active snubber further includes a first auxiliary diode coupled across the active switch.

Preferably, the active switch includes a parasitical body diode.

Preferably, a series-coupled branch including a second auxiliary diode and a second snubber capacitor is further coupled between a drain terminal and a source terminal of the second synchronous MOSFET, and the second snubber capacitor is coupled in parallel with the first snubber capacitor.

Preferably, the synchronous rectifier is selected from the group consisting of: a half-wave synchronous rectifier; a center-tapped synchronous rectifier; and a current doubler synchronous rectifier.

Preferably, the synchronous rectifier further includes a synchronous switch post regulator circuit.

In accordance with the second aspect of the present invention, the active snubber is coupled across a synchronous rectifier having a first synchronous MOSFET and a second synchronous MOSFET coupled to a transformer in a power converter. The active snubber includes: a series-coupled active switch and first snubber capacitor which is coupled between a drain terminal and a source terminal of the first synchronous MOSFET, an auxiliary winding for driving the active switch to keep the active switch conducting a specified period of time during a non-conduction interval of the first synchronous MOSFET.

Preferably, the active switch is a N-channel MOSFET.

Preferably, the active switch is a P-channel MOSFET.

Preferably, the auxiliary winding is derived from the transformer.

Preferably, the power converter further includes an output filter circuit having at least an output inductor and an output capacitor, and the auxiliary winding is derived from the output inductor.

Preferably, the active snubber further includes a first auxiliary diode coupled across the active switch.

Preferably, the active switch includes a parasitical body diode.

Preferably, a series-coupled branch including a second auxiliary diode and a second snubber capacitor is further coupled between a drain terminal and a source terminal of the second synchronous MOSFET, and the second snubber capacitor is coupled in parallel with the first snubber capacitor.

Preferably, the synchronous rectifier is selected from the group consisting of: a half-wave synchronous rectifier; a center-tapped synchronous rectifier; and a current doubler synchronous rectifier.

Preferably, the synchronous rectifier further includes a synchronous switch post regulator circuit.

In accordance with the third aspect of the present invention, the active snubber is coupled across a synchronous rectifier having a first synchronous MOSFET and a second synchronous MOSFET coupled to a transformer in a power converter. The active snubber includes: a series-coupled active switch and first snubber capacitor which is coupled between a drain terminal of the first synchronous MOSFET and a positive terminal of a DC output of the power converter, an auxiliary winding for driving the active switch to keep the active switch conducting a specified period of time during a non-conduction interval of the first synchronous MOSFET.

The present invention may best be understood through the following description with reference to the accompanying drawings, in which:

DETAILED DESCRIPTION OF THE PREFERRED EMBODIMENT

Although this invention is susceptible to embodiments of many different forms, some preferred embodiments would be described and illustrated in detail hereinafter. The present disclosure exemplifies the principle of the invention and is not to be considered a limitation to the broader aspects of the invention to the particular embodiment as described.

Figure 1:
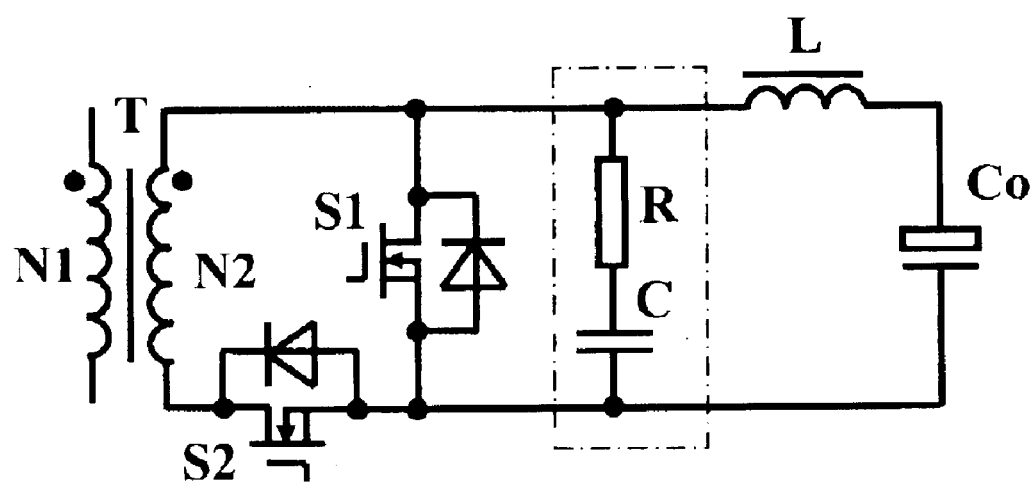
FIG. 1 is a schematic diagram of a conventional RC snubber circuit.
Figure 2:
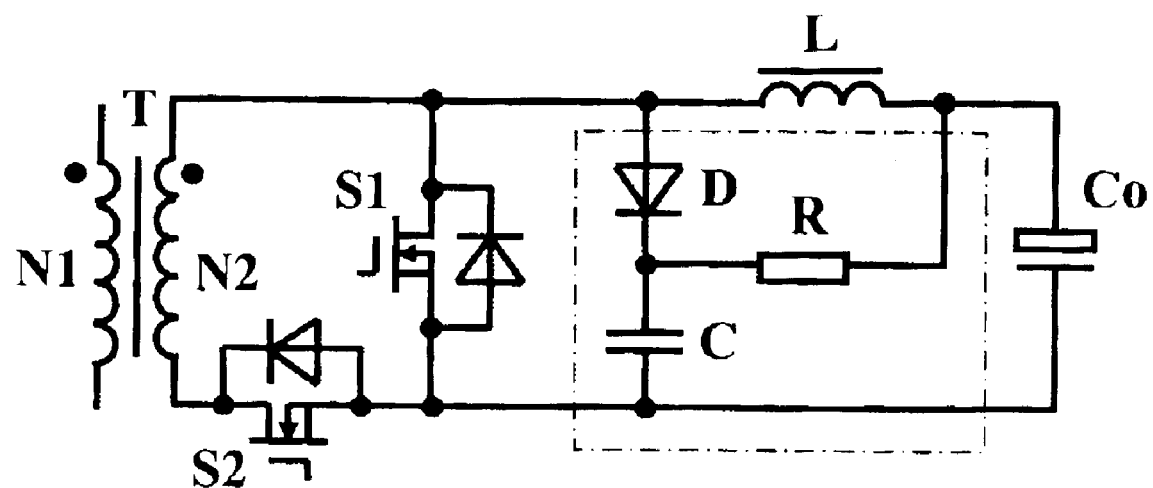
FIG. 2 is a schematic diagram of a conventional RCD clamping circuit.
Figure 3:
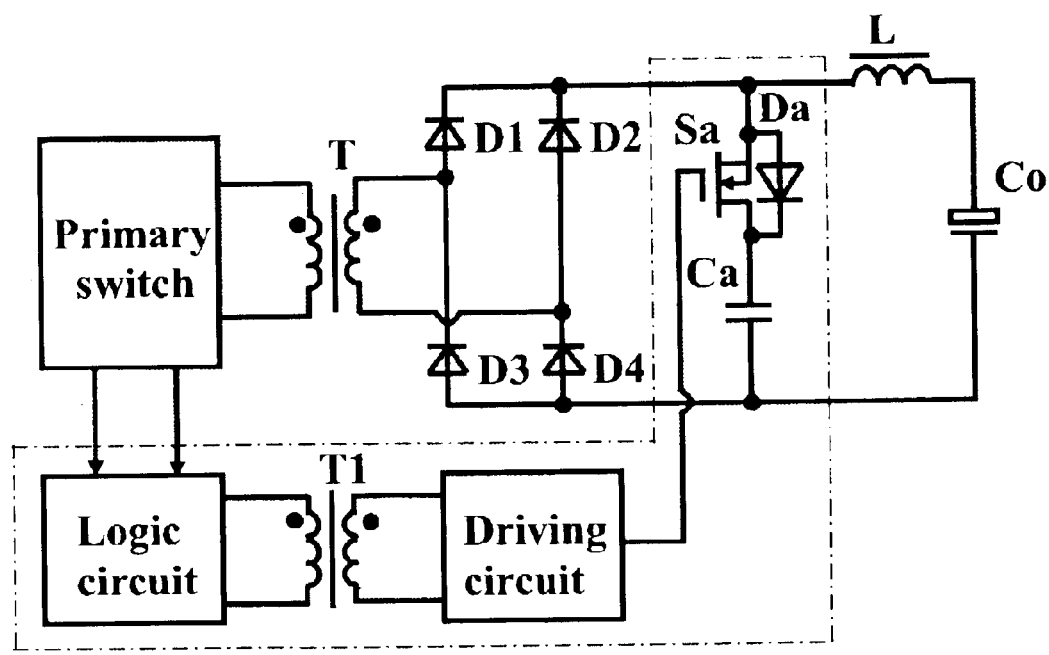
FIG. 3 is a schematic diagram of a previous proposed active snubber circuit implemented in a full-bridge diode rectifier.
Figure 4:
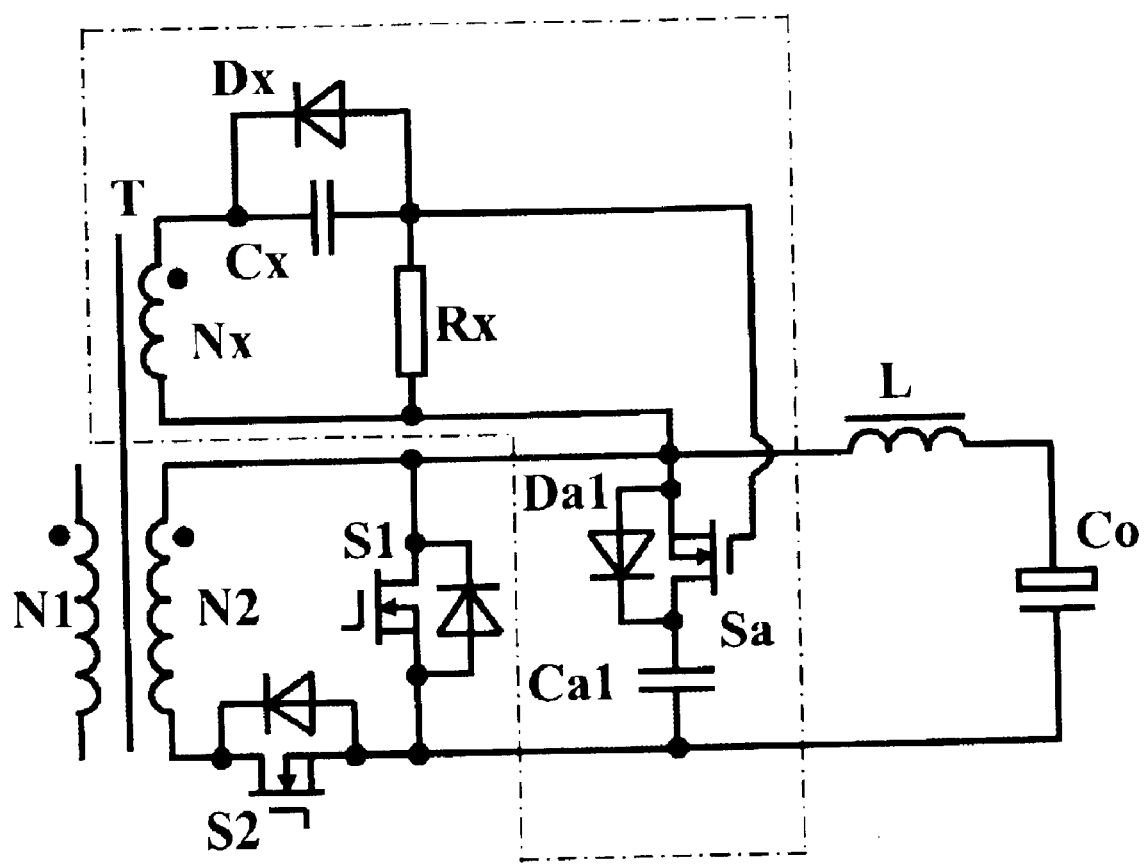
FIG. 4 is an active snubber applied to a half-wave synchronous rectifiers circuit according to a first preferred embodiment of the present invention.

Please refer initially to FIG. 4 that illustrates a schematic diagram of a half-wave synchronous rectifier according to a first preferred embodiment of the present invention. The half-wave synchronous rectifier includes a transformer T having a primary winding N1 and a secondary winding N2. The synchronous rectifier includes a freewheeling synchronous MOSFET S1 and a forward synchronous MOSFET S2 coupled to the transformer T. The positive terminal of the secondary winding N2 is connected to the drain of the freewheeling synchronous MOSFET S1 whose source is connected to a ground reference. And the negative terminal of the secondary winding N2 is connected to the drain of the forward synchronous MOSFET S2 whose source is connected to the ground reference too. The synchronous rectifier circuit further includes an output filter having an output inductor L and an output capacitor Co. The output inductor L has a first terminal connected to the positive terminal of the secondary winding N2, and a second terminal connected to the positive terminal of the output capacitor Co. The negative terminal of the capacitor Co is tied to the ground reference, The half-wave synchronous rectifier is turned on and off, in synchronicity with the voltage signal across the secondary winding N2. During this process the voltage across the secondary winding N2 is rectified into a series of positive voltage pulse, which is applied to the output filter, and substantially a DC voltage is obtained across the output capacitor Co.

The active snubber of the present invention is coupled across the freewheeling synchronous MOSFET S1. The active snubber includes an active switch Sa employing a N-channel MOSFET, a first auxiliary diode Da1, a first snubber capacitor Ca1 and a gate driver for the active switch Sa. The active switch Sa has its source tied to the drain of the freewheeling synchronous MOSFET S1, and its drain tied to a first terminal of the first snubber capacitor Ca1. Another terminal of the first snubber capacitor Ca1 is connected to the source of the freewheeling synchronous MOSFET S1. The first auxiliary diode Da1 is coupled across the active switch Sa in parallel. Of course, those skilled in the pertinent art will understand, however, that the first auxiliary diode Da1 can also be the parasitical diode of the active switch Sa itself.

The gate driver for the active switch Sa includes an auxiliary winding Nx coupled to the transformer T, a capacitor Cx, a diode Dx and a resistor Rx. One of the terminals of the auxiliary winding Nx, which has the same polarity with the positive terminal of the secondary winding N2, is coupled to a terminal of the capacitor Cx. The other terminal of the capacitor Cx is coupled to the gate of the active switch Sa. Furthermore, the other terminal of the auxiliary winding Nx is coupled to the source of the active switch Sa. The diode Dx is coupled to the capacitor Cx in parallel, wherein the cathode is connected to the auxiliary winding Nx and the anode is connected to the gate of the active switch Sa. The resistor Rx is coupled across the gate and the source of the active switch Sa.

Figure 5:
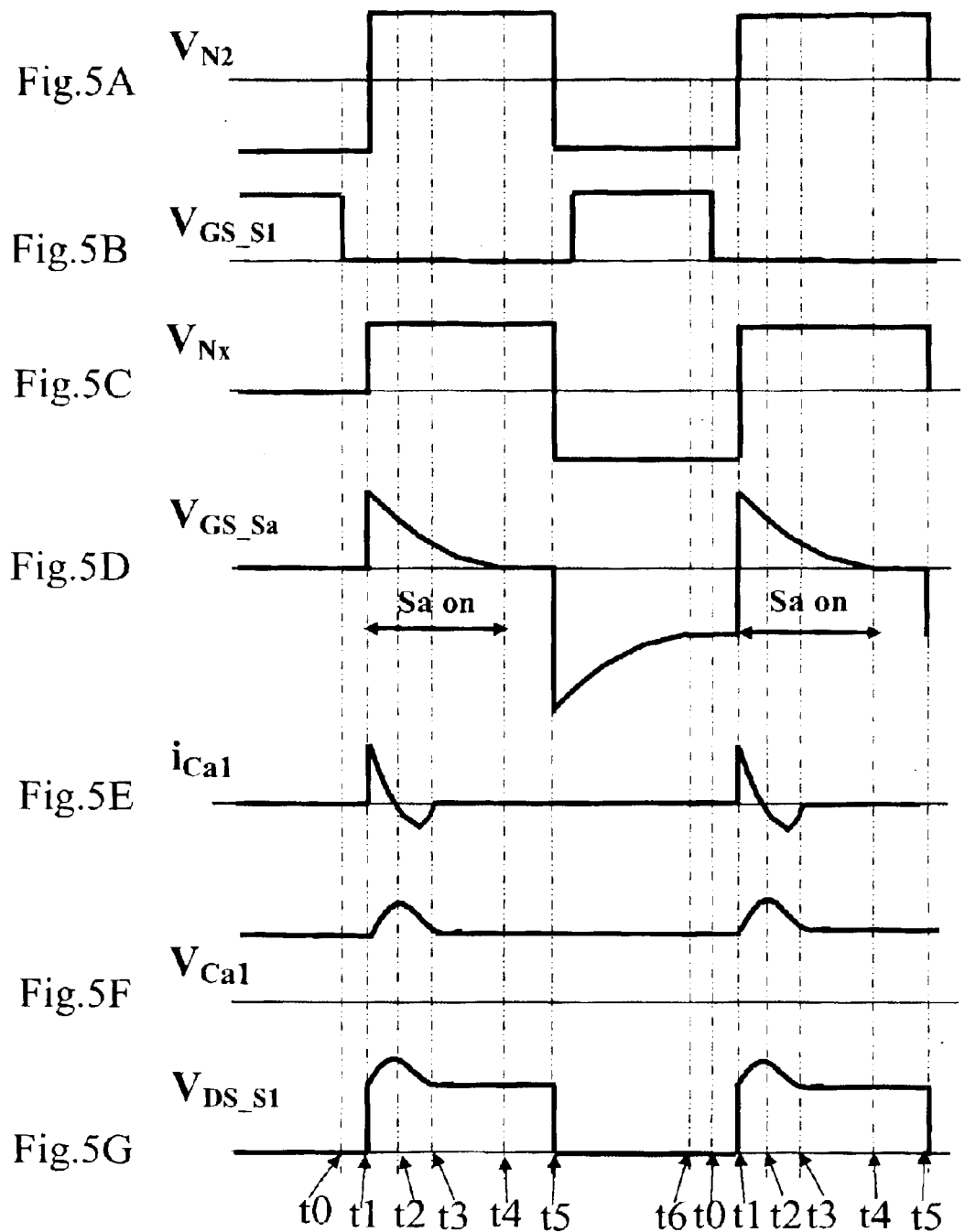
FIGS. 5A–5G are a series of voltage and current waveforms illustrating the operation of the present invention shown in FIG. 4.

FIGS. 5A through 5G illustrate the operation voltage and current waveforms of the active snubber according to the present invention. FIG. 5A represents the voltage applied to the secondary winding N2. FIG. 5B represents the gate voltage of the freewheeling synchronous MOSFET S1. FIG. 5C shows the voltage across the auxiliary winding Nx. FIG. 5D represents the gate voltage of the active switch Sa. As shown in FIG. 5E, it is the current flowing through the first snubber capacitor Ca1. FIG. 5F shows the voltage across the first snubber capacitor Ca1. And, FIG. 5G represents the drain source voltage of the freewheeling synchronous MOSFET S1.

The operation principle of the active snubber implemented in synchronous rectifier is described as follows. At t=t1, the voltage on the secondary winding N2 of the transformer T becomes positive and so does the auxiliary winding Nx. The positive voltage on the auxiliary winding Nx charges the capacitor Cx via the resistor Rx. Since the voltage on the capacitor Cx is initialed to zero, the positive voltage $V_{Nx}$ on the auxiliary winding Nx is filly applied to the gate of the active switch Sa, thus the active switch Sa is turned on at time t1. During the period of t1 to t4, the voltage on the auxiliary winding Nx charges the capacitor Cx continually, and the gate voltage of the active switch Sa decreases gradually. At t=t4, the voltage across Cx is charged to high and meanwhile the gate voltage of the active switch Sa is decreased to low enough, so the active switch Sa is turned off. The conduction time of the active switch Sa is determined by the capacitance of Cx and the resistance of Rx. At t=t5, the voltage on the auxiliary winding Nx changes from positive voltage to negative, and the negative auxiliary winding voltage plus the voltage on capacitor Cx is applied to the gate of active switch Sa to keep it off. During the period of t5 to t6 the capacitor Cx is discharged via the resistor Rx. At t=t6, the voltage of the capacitor is discharged to zero, and the diode Dx forward biased then. The active switch Sa is kept in off state till a next operation cycle.

From analysis above, it is seen that the active switch Sa will conduct a period of time during the interval when the freewheeling synchronous MOSFET S1 is turned off. With such control logic of the active switch Sa, the voltage spike existing on the freewheeling synchronous MOSFET S1 can be eliminated losslessly and effectively. Since the turning off of the active switch Sa is prior to the turning on of the freewheeling synchronous MOSFET S1, a constant DC voltage is obtained on the first snubber capacitor Ca1, whose magnitude is kept the same as that of the pulse voltage appearing across the secondary winding N2. As a result, the first snubber capacitor Ca1 can be selected large enough to eliminate the voltage spike effectively and meanwhile will not cause any over current in circuit. Accordingly, the active snubber proposed in the present invention can eliminate the voltage spike losslessly and effectively with the very simple and less component count gate-drive circuit.

Figure 6:
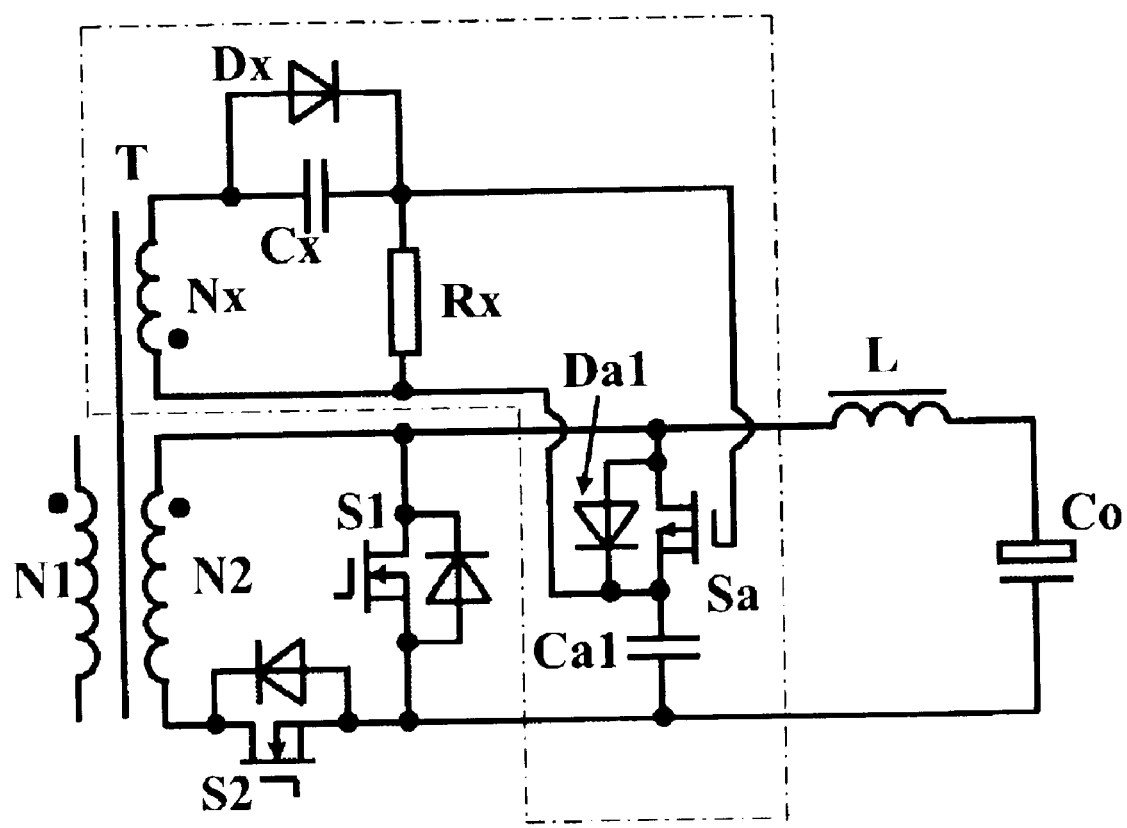
FIG. 6 is an active snubber applied to a half-wave synchronous rectifier circuit according to a second preferred embodiment of the present invention.

FIG. 6 shows an active snubber employing a P-channel MOSFET according to a second preferred embodiment of the present invention. The active switch Sa of the active snubber may employ a P-channel MOSFET instead of a N-channel MOSFET. The active switch Sa has its drain tied to the drain of the freewheeling synchronous MOSFET S1, and its source tied to the first terminal of the first snubber capacitor Ca1. Since the turning-on voltage of the gate of the P-channel MOSFET is negative, some modifications are needed for the driving circuit of the active, switch Sa. The polarity of the auxiliary winding terminals Nx is reversed and so is the polarity of the diode Dx.

Figure 7:
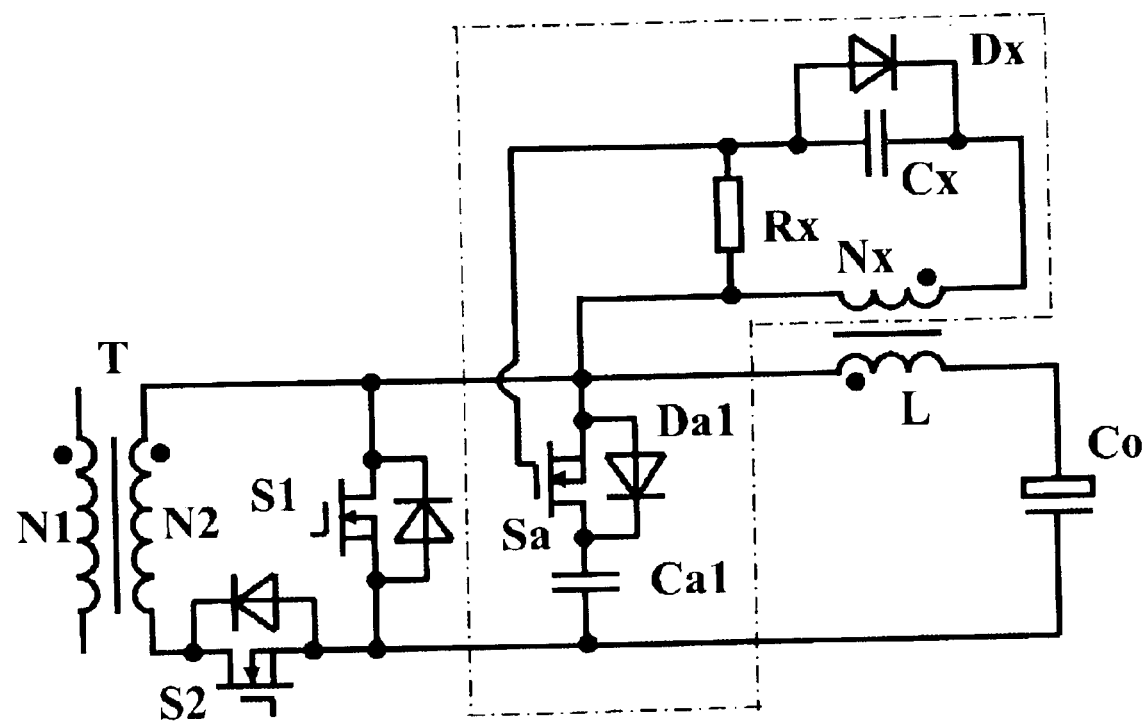
FIG. 7 is an active snubber applied to a half-wave synchronous rectifier circuit according to a third preferred embodiment of the present invention.

FIG. 7 shows the third preferred embodiment of the present invention. The configuration of the active snubber of FIG. 7 is very similar with that of FIG. 4, except that the auxiliary winding Nx is coupled with the output inductor L, rather than the transformer T.

Figure 8:
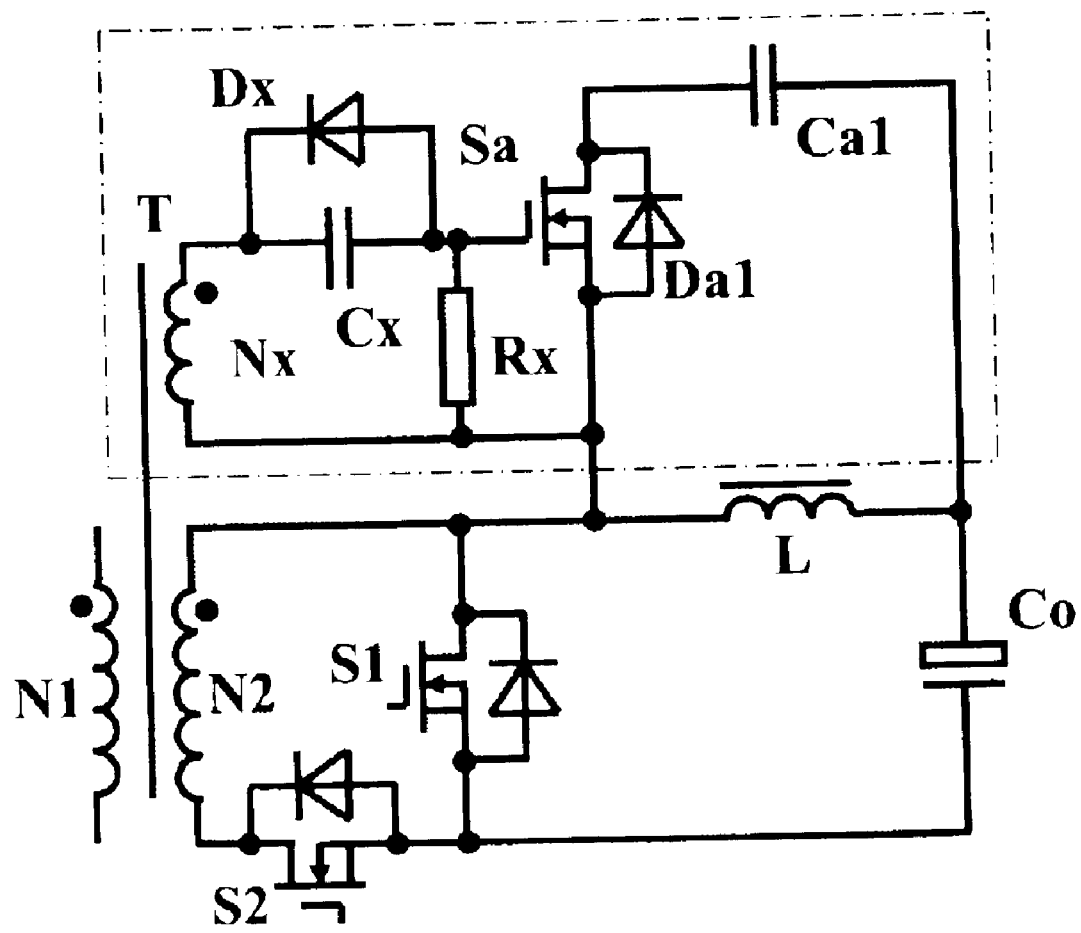
FIG. 8 is an active snubber applied to a half-wave synchronous rectifier circuit according to a fourth preferred embodiment of the present invention.

FIG. 8 shows the fourth preferred embodiment of the present invention. The terminal of the first snubber capacitor Ca1 that is connected to the source of the freewheeling synchronous MOSFET S1 can also be connected to the positive terminal of the DC output of the power converter. When the voltage spike charges the first snubber capacitor Ca1, the charge current is not only flowing through the first snubber capacitor Ca1, but also flowing into the positive terminal of the DC output. Hence a portion of the spike energy is directly transferred to the output load.

Figure 9:
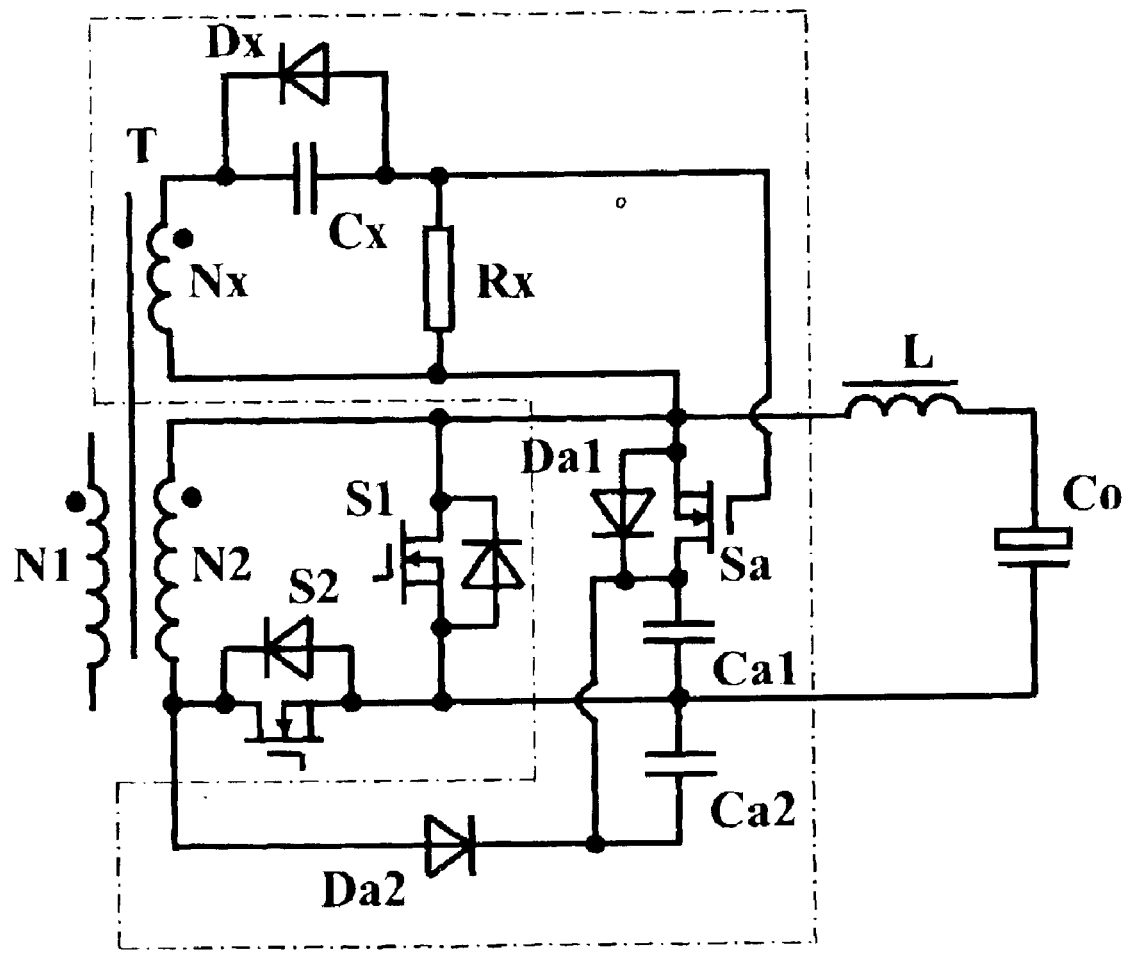
FIG. 9 is an active snubber applied to a half-wave synchronous rectifier circuit according to a fifth preferred embodiment of the present invention.

FIG. 9 is a schematic of the active snubber applied to the half-wave synchronous rectifier according to a fifth preferred embodiment of the present invention. A second active snubber can further be coupled to the forward synchronous MOSFET S2, and thereby the voltage spikes of both the forward synchronous MOSFET S2 and the freewheeling synchronous MOSFET S1 can be effectively eliminated, whereas the active snubber for the synchronous rectifier can be simplified further. As shown in FIG. 9, the active switch for the forward synchronous MOSFET S2 is replaced with an second auxiliary diode Da2 of which the anode terminal is connected to the drain of the forward synchronous MOSFET S2 and the cathode terminal is connected to a second snubber capacitor Ca2 which is coupled across the first snubber capacitor Ca1 in parallel. The second snubber capacitor Ca2 can absorb the spike energy of the forward synchronous MOSFET S2 via the second auxiliary diode Da2, and the storage energy can be discharged via the active switch Sa. In this way, only one active switch with gate driver is needed. In addition, the first snubber capacitor Ca1 and the second snubber capacitor Ca2 can be combined into a single one when the forward synchronous MOSFET S2 and the freewheeling synchronous S1 are placed sufficiently close in layout.

It is understood that the present invention may be implemented in other synchronous rectifiers other than the half-wave synchronous rectifier.

Figure 10:
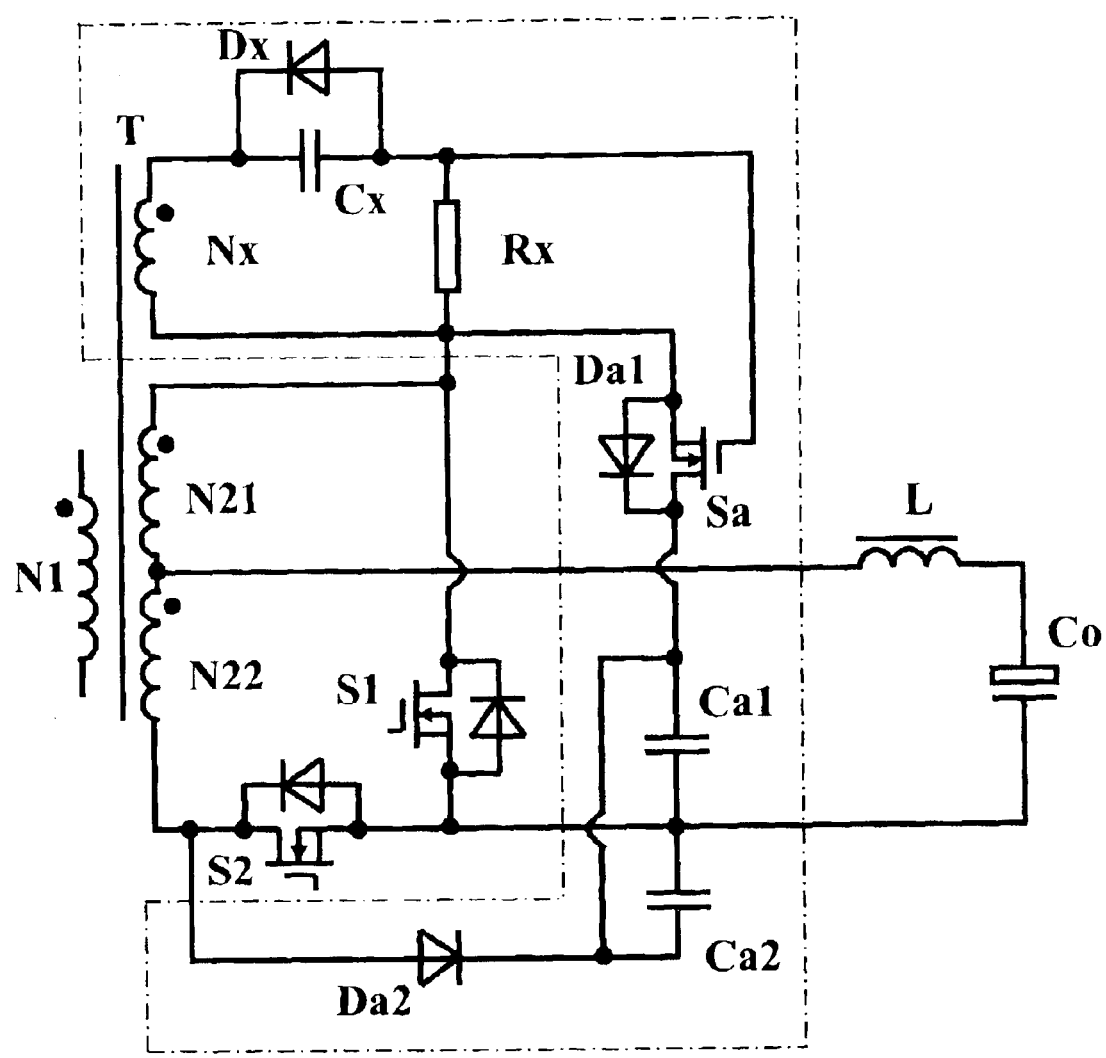
FIG. 10 is an active snubber applied to a center-tapped synchronous rectifier circuit according to a sixth preferred embodiment of the present invention.

First, the active snubber may be implemented in a center-tapped synchronous rectifier. As shown in FIG. 10, a series branch consisting of an active switch Sa and a first snubber capacitor Ca1 is coupled across one of the secondary synchronous MOSFET S1. Another series branch consisting of an second auxiliary diode Da2 and a second snubber capacitor Ca2 is coupled across the secondary synchronous MOSFET S2. The capacitor Ca1 and capacitor Ca2 are coupled in parallel, and they can also be combined into a single one. The drive circuit for the active switch Sa has the same arrangement as that shown in FIG. 9.

Figure 11:
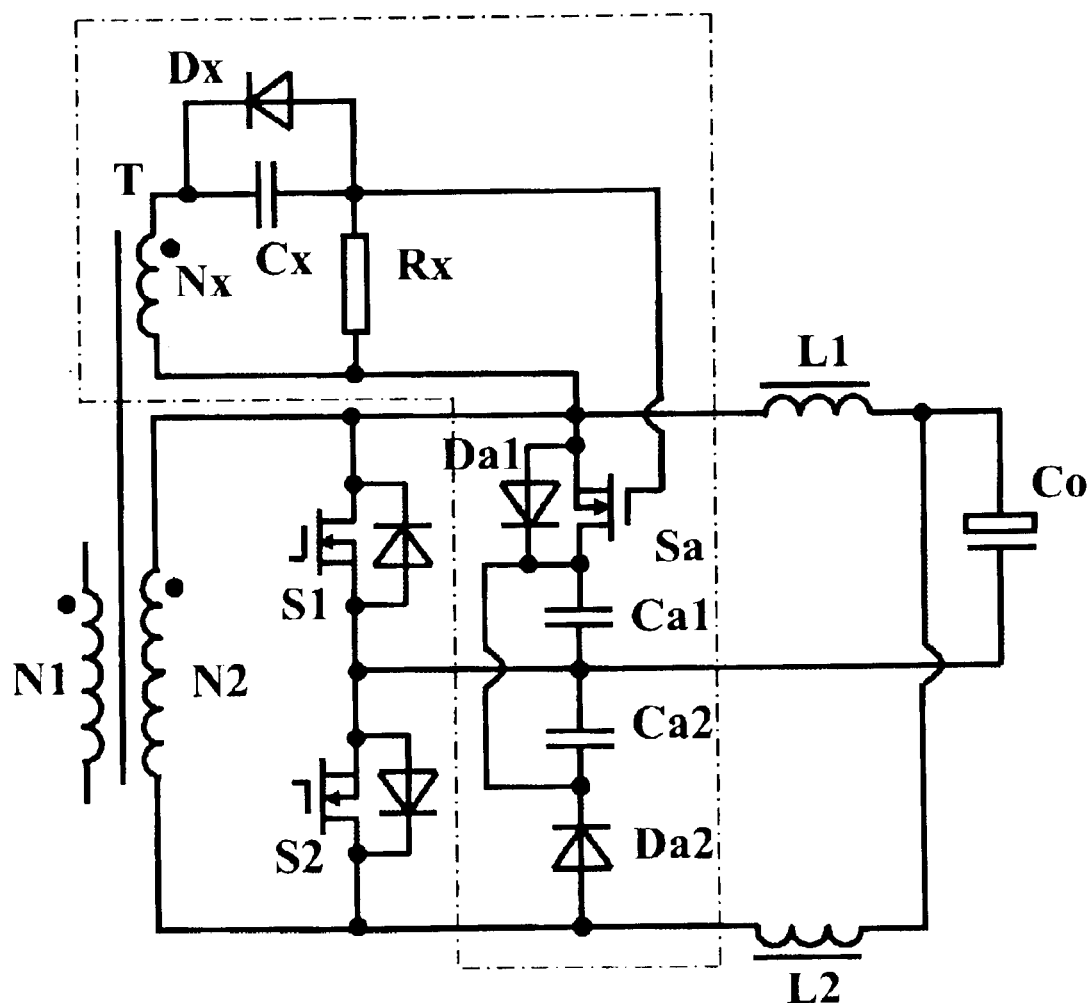
FIG. 11 is an active snubber applied to a current-double synchronous rectifier circuit according to a seventh preferred embodiment of the present invention.

Further, the present invention may be implemented in a current doubler synchronous rectifier. As shown in FIG. 11, an active switch Sa and a first snubber capacitor Ca1 connected in series is coupled across one of synchronous MOSFET S1, and a second auxiliary diode Da2 and a second snubber capacitor Ca2 connected in series is coupled across the second synchronous MOSFET S2. The active snubber circuit has the same components arrangement as that shown in FIG. 9.

Figure 12:
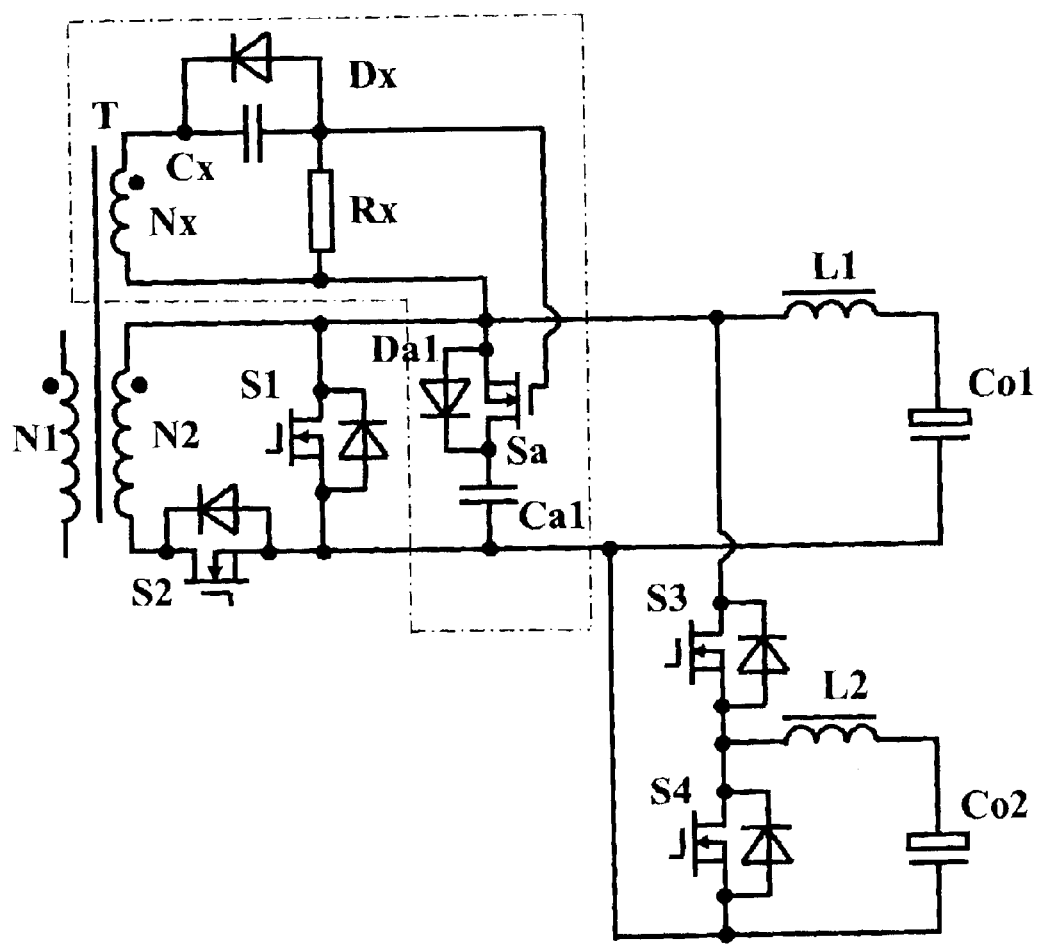
FIG. 12 is an active snubber applied to a synchronous switch post regulator circuit according to an eighth preferred embodiment of the present invention.

Still further, the present invention may also be implemented in a synchronous switch post regulator circuit. The synchronous switch post regulator circuit is a common approach used in multiple output power converter to realize tight regulation of the auxiliary output. As shown in FIG. 12, the active snubber consisting of the active switch Sa and the first snubber capacitor Ca1 connected in series is coupled across the drain and the source of the freewheeling synchronous MOSFET S1 of the first output. As a result, all of the voltage spike and high frequency ringing occurring on the freewheeling synchronous MOSFET S1 of the first output, the synchronous switch S3 and the freewheeling synchronous MOSFET S4 of the second output are eliminated effectively.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims that are to be accorded with the broadest interpretation so as to encompass all such modifications and similar structure.

What is claimed is:

1. An active snubber coupled across a synchronous rectifier which has a first synchronous switch and a second synchronous switch coupled to a transformer in a power converter, comprising:
    a series-coupled active switch and first snubber capacitor coupled between a first terminal and a second terminal of said first synchronous switch;
    a gate driver operative to keep said active switch conducting a specified period of time during a non-conduction interval of said first synchronous switch, comprising:
        an auxiliary winding;
        a capacitor connected to one terminal of said auxiliary winding, wherein said auxiliary winding and said capacitor being coupled between a first terminal and a second terminal of said active switch; and
        a resistor coupled between said first terminal and said second terminal of said active switch.

2. The active snubber as recited in claim 1, wherein said first synchronous switch and second synchronous switch are MOSFETs.

3. The active snubber as recited in claim 1, wherein said first and second terminals of said first synchronous switch are drain and source terminals thereof respectively.

4. The active snubber as recited in claim 1, wherein said active switch is a N-channel MOSFET.

5. The active snubber as recited in claim 1, wherein said active switch is a P-channel MOSFET.

6. The active snubber as recited in claim 1, wherein said first and second terminals of said active switch are gate and source terminals thereof respectively.

7. The active snubber as recited in claim 1, wherein said gate driver further comprises a diode coupled across said capacitor.

8. The active snubber as recited in claim 1, wherein said auxiliary winding is derived from said transformer.

9. The active snubber as recited in claim 1, wherein said power converter further comprises an output filter circuit having at least an output inductor and an output capacitor, and said auxiliary winding is derived from said output inductor.

10. The active snubber as recited in claim 1 further comprising a first auxiliary diode coupled across said active switch.

11. The active snubber as recited in claim 1, wherein said active switch further comprises a parasitical body diode.

12. The active snubber as recited in claim 1, wherein said active snubber further comprises a series-coupled branch including a second auxiliary diode and a second snubber capacitor; said branch is coupled between a first terminal and a second terminal of said second synchronous switch, and said second snubber capacitor is coupled in parallel with said first snubber capacitor.

13. The active snubber as recited in claim 12, wherein said first and second terminals of said second synchronous switch arc drain and source terminals thereof respectively.

14. The active snubber as recited in claim 1, wherein said synchronous rectifier is selected from the group consisting of a half-wave synchronous rectifier, a center-tapped synchronous rectifier, and a current doubler synchronous rectifier.

15. The active snubber as recited in claim 1, wherein said synchronous rectifier further comprises a synchronous switch post regulator circuit.

16. An active snubber coupled across a synchronous rectifier having a first synchronous switch and a second synchronous switch coupled to a transformer in a power converter, comprising:
    a series-coupled active switch and first snubber capacitor coupled between a first terminal and a second terminal of said first synchronous switch; and
    an auxiliary winding for driving said active switch to keep said active switch conducting a specified period of time during a non-conduction interval of said first synchronous switch.

17. The active snubber as recited in claim 16, wherein said first synchronous switch and second synchronous switch are MOSFETs.

18. The active snubber as recited in claim 16, wherein said first and second terminals of said first synchronous switch are drain and source terminals thereof respectively.

19. The active snubber as recited in claim 16, wherein said active switch is a N-channel MOSFET.

20. The active snubber as recited in claim 16, wherein said active switch is a P-channel MOSFET.

21. The active snubber as recited in claim 16, wherein said auxiliary winding is derived from said transformer.

22. The active snubber as recited in claim 16, wherein said power converter further comprises an output filter circuit having at least an output inductor and an output capacitor, and said auxiliary winding is derived from said output inductor.

23. The active snubber as recited in claim 16 further comprising a first auxiliary diode coupled across said active switch.

24. The active snubber as recited in claim 16, wherein said active switch further comprises a parasitical body diode.

25. The active snubber as recited in claim 16, wherein said active snubber further comprises a series-coupled branch including a second auxiliary diode and a second snubber capacitor; said branch is coupled between a first terminal and a second terminal of said second synchronous switch, and said second snubber capacitor is coupled in parallel with said first snubber capacitor.

26. The active snubber as recited in claim 16, wherein said first and second terminals of said second synchronous switch are drain and source terminals thereof respectively.

27. The active snubber as recited in claim 16, wherein said synchronous rectifier is selected from the group consisting of a half-wave synchronous rectifier, a center-tapped synchronous rectifier, and a current doubler synchronous rectifier.

28. The active snubber as recited in claim 16, wherein said synchronous rectifier further comprises a synchronous switch post regulator circuit.

29. An active snubber coupled across a synchronous rectifier having a first synchronous switch and a second synchronous switch coupled to a transformer in a power converter, comprising:

a series-coupled active switch and first snubber capacitor coupled between a first terminal of said first synchronous switch and a positive terminal of a DC output of said power converter; and an auxiliary winding for driving said active switch to keep said active switch conducting a specified period of time during a non-conduction interval of said first synchronous switch.

* * * * *

UNITED STATES PATENT AND TRADEMARK OFFICE
CERTIFICATE OF CORRECTION

PATENT NO. : 6,771,521 B1 Page 1 of 1
DATED : August 3, 2004
INVENTOR(S) : Yahong Xiong et al.

It is certified that error appears in the above-identified patent and that said Letters Patent is hereby corrected as shown below:

<u>Column 8,</u>
Line 45, delete "arc" and insert -- are --.

Signed and Sealed this

Eighteenth Day of January, 2005

JON W. DUDAS
*Director of the United States Patent and Trademark Office*